(12) United States Patent
Andersson

(10) Patent No.: US 6,263,547 B1
(45) Date of Patent: Jul. 24, 2001

(54) CLAMPING JOINT FOR INTERCONNECTION OF A CLAMPING LOCK

(75) Inventor: Thommy Andersson, Västra Frölunda (SE)

(73) Assignee: Talurit AB, Vastra Frolunda (SE)

( * ) Notice: Subject to any disclaimer, the term of this patent is extended or adjusted under 35 U.S.C. 154(b) by 0 days.

(21) Appl. No.: 09/214,792

(22) PCT Filed: Jul. 14, 1997

(86) PCT No.: PCT/SE97/01274

§ 371 Date: Aug. 12, 1999

§ 102(e) Date: Aug. 12, 1999

(87) PCT Pub. No.: WO98/02675

PCT Pub. Date: Jan. 22, 1998

(30) Foreign Application Priority Data

Jul. 12, 1996 (SE) ................................... 9602761
Dec. 23, 1996 (SE) ................................... 9604776

(51) Int. Cl.$^7$ ................................. F16B 7/10; F16G 11/02
(52) U.S. Cl. .................. 24/115 R; 24/135 R; 24/135 N; 411/70
(58) Field of Search ............................ 24/115 R, 135 R, 24/135 A, 135 N; 411/70

(56) References Cited

U.S. PATENT DOCUMENTS

| 166,082 | * | 7/1875 | Drinkhouse | 24/135 R |
| 526,123 | * | 9/1894 | Boots et al. | 24/135 N |
| 3,897,664 | * | 8/1975 | Bogese, II | 24/115 R |
| 4,177,542 | * | 12/1979 | Denney | 24/115 R |
| 4,302,124 | * | 11/1981 | Wilks et al. | 403/391 |
| 4,342,477 | * | 8/1982 | McClure | 24/135 N |
| 4,771,516 | | 9/1988 | Foth . | |
| 4,955,750 | * | 9/1990 | Goran | 24/115 R |
| 5,330,473 | * | 7/1994 | Howland | 606/61 |

FOREIGN PATENT DOCUMENTS

| 0623406 | * | 7/1933 | (DE) | 24/135 N |
| 0456052 | * | 8/1913 | (FR) | 24/115 R |
| PCT/GB94/ 02025 | | 9/1994 | (WO) . | |

* cited by examiner

Primary Examiner—Victor N. Sakran
(74) Attorney, Agent, or Firm—Samuels, Gauthier & Stevens, LLP

(57) ABSTRACT

A clamping joint and a method for producing such a joint for interconnection of a clamping lock with at least one wire, which is insertable therein, and which clamping lock after compression during plastic deformation in a clamping tool seizes and arrests the wire in the sleeve. A least one locking member is embedded in the wire and connected to the lock, under clamping of the wire against the clamping lock.

10 Claims, 5 Drawing Sheets

CLAMPING JOINT FOR INTERCONNECTION OF A CLAMPING LOCK

This application is a 371 of PCT/SE97/01274 filed on Jul. 14, 1997.

TECHNICAL FIELD

The present invention refers to a clamping joint for interconnection of a clamping lock with at least one wire, which is insertable therein, and which clamping lock after compression under plastic deformation in a clamping tool seizes and arrests the wire in the lock. Furthermore the invention refers to a method for producing such a clamping joint.

BACKGROUND OF THE INVENTION

Clamping joints of the above described type are mostly used for interconnection of two steel wire parts, e.g. for forming a loop or the like. Nowadays ropes of steel and natural/synthetical fibres are often used, and an example of such a combined wire is a steel wire having easily seizable synthetic fibres. As examples of possible applications can be mentioned manropes, safety ropes, protective nets, playing implements, fishing tools, stage implements, tools for sports and leisure time, etcetera.

TECHNICAL PROBLEM

Joints for this purpose are known and incorporate usually two parts, which are clamped together by means of screws. An essential drawback in the above described joint is that the compression of the sleeve is difficult to make in a controlled manner, thus that the method always results in a correct interconnection without risk for sliding. A small mutual sliding between two ropes may for instance result in that the mesh size of a protective net is altered, thus that it will not fulfill its protective function. Each joint must therefore be carefully tested in respect of strength. In such joints that is low and non-uniform.

PURPOSE OF THE INVENTION

The purpose of the present invention is to provide a clamping joint, which in spite of use of inexpensive structural materials, gives possibility of providing correct interconnections between a clamping lock and one or more wires in a reproductive manner, and which interconnections have a high tensile strength. Furthermore the clamping lock can be positioned with a high degree of accuracy on the wire/wires and be effectively arrested in this position.

THE SOLUTION

These tasks have been solved in that at least one locking member under clamping of the wire against the clamping lock is embedded in the wire and connected to the clamping lock.

The method according to the invention is characterized therein that prior to the compression, at least one locking member is introduced through an opening in the lock and is pressed or screwed into the wire, whereupon the sleeve is subjected to said compression, whereby the material of the lock flows into and adapts itself to the shape of the wire and at least partially to the locking member.

DESCRIPTION OF THE DRAWINGS

Hereinafter the invention will be described in some embodiments with reference to the accompanying drawings.

DESCRIPTION OF EMBODIMENTS

Figure 1:
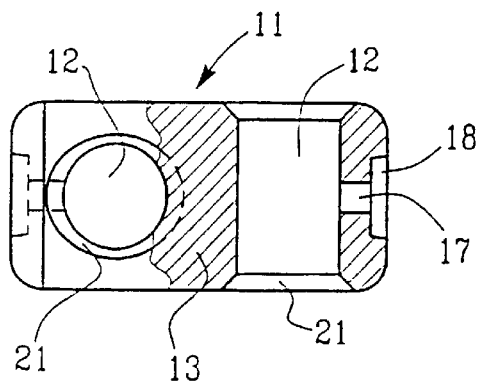
FIG. 1 shows a clamping lock, partly in section, for production of a X-shaped clamping joint in accordance with the invention, for interconnection of two wires positioned cross-wise.
Figure 2:
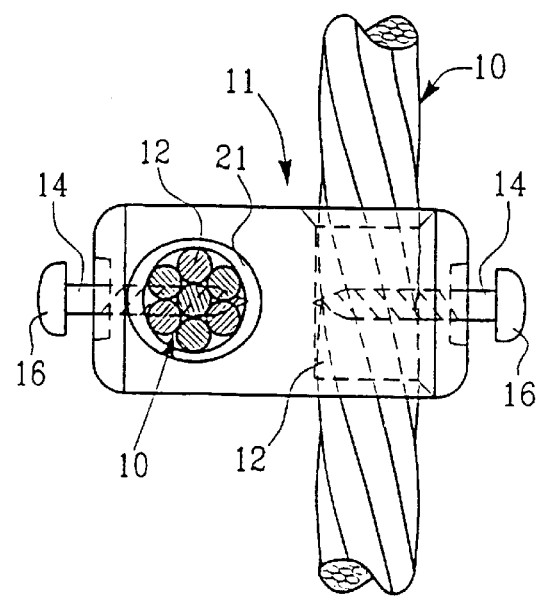
FIG. 2 shows the clamping joint according to FIG. 1 ready for clamping.
Figure 3:
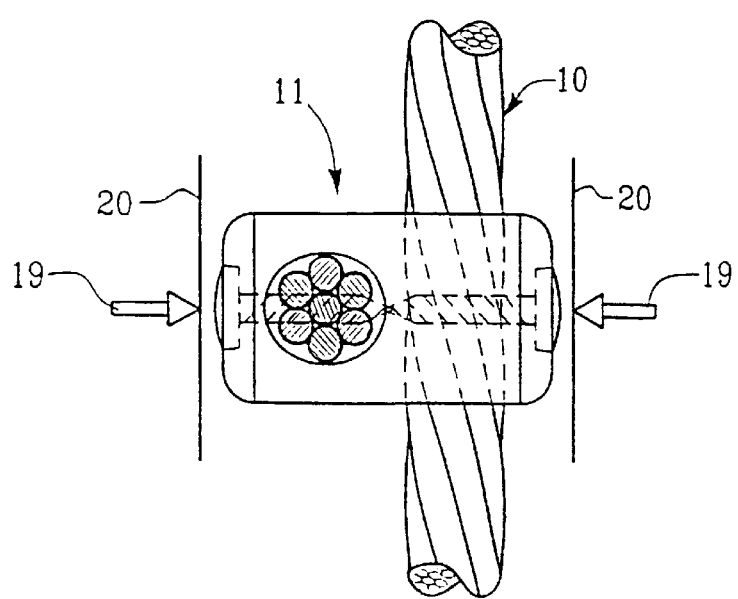
FIG. 3 shows the clamping joint according to FIG. 2 after finished clamping.
Figure 4:
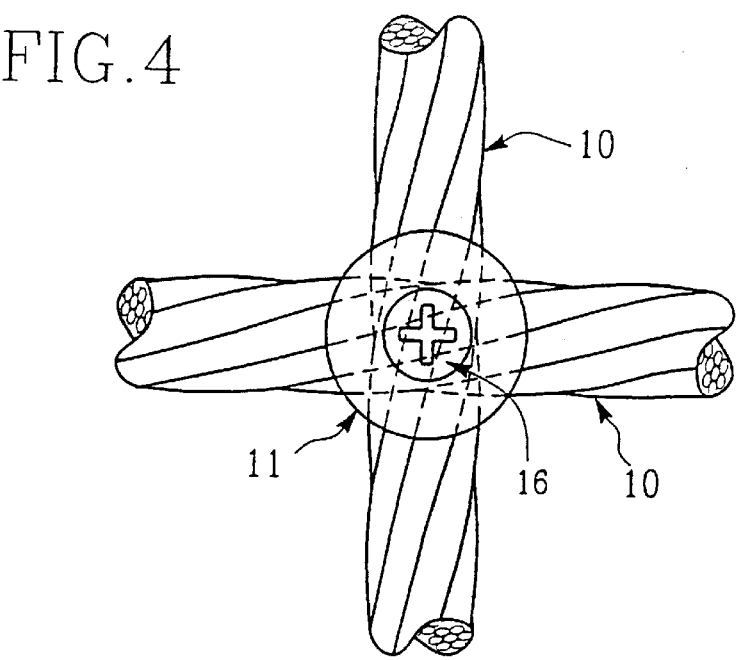
FIG. 4 shows the clamping joint according to FIG. 3 in a front view.

The clamping lock 11 shown in FIGS. 1–3 is used for forming a clamping joint for crosswise or X-shaped interconnection of two wires 10. The clamping lock 11 is shaped as a cylinder through which extends two transverse holes 12, displaced 90° relative to each other. These holes are spaced apart from each other by means of an intermediate wall portion 13. The clamping joint incorporates also two locking members 14, which are designed as conventional screws with tip 15 and head 16. At each end the lock 11 is provided with a coaxial bore 17 adapted to receive the associated screw 14 and a recess 18 for receiving the screw head 16.

The wire 10 can for instance consist of a combined wire of steel and soft easily seizable fibres. The lock 11 can be produces from extruded aluminum, which corresponds to the highest demands for plastic ductility during clamping.

FIG. 2 shows the clamping lock according to FIG. 1, ready for clamping by means of not shown clamping jaws. Introduction of the wires 10 into the bores 12 is facilitated by the chamfers 21. The screws 14 are tightened through the different wires 10, entirely up to the intermediate wall 13, whereby a space is left between each screw head 16 and its associated recess 18.

FIG. 3 shows the clamping joint after finished clamping. The arrows 19 show the main directions of the clamping, whereby the lines 20 show the original longitudinal measure of the clamping lock 11. During the clamping operation of the material of the lock has been subjected to plastic deformation and it thereby has adapted itself on one hand to the form space of the clamping jaws and on the other hand to the shape of the wire 10 and of the screws 14 in the form space, Thus under compression of the wire the lock material will form itself to the surface structure of the wire, at the same time as the screws 14 are driven into the intermediate wall 13. Thereby the lock material will flow into the thread grooves of the screws, at one hand at the tips 15 and at the other hand at the bores 17, and will form a firm connection on both sides of each wire 10 with the screws 14, which are manufactured from a harder material, e.g. stainless steel, which is not subjected to plastic deformation. The screws can of course also be screwed entirely into their bores before the clamping operation is started.

By means of the above described clamping joint is obtained an absolute mutual arrestment of the wires, which means that the factor, which is dimensioning for the strength is represented by the cross sectional area of the lock. Consequently it is simple to obtain a standardized strength in every separate clamping joint. The combination as described above gives a clamping joint having very low weight and compact dimensions in relation to the maximum load and this at low cost.

Figure 5:
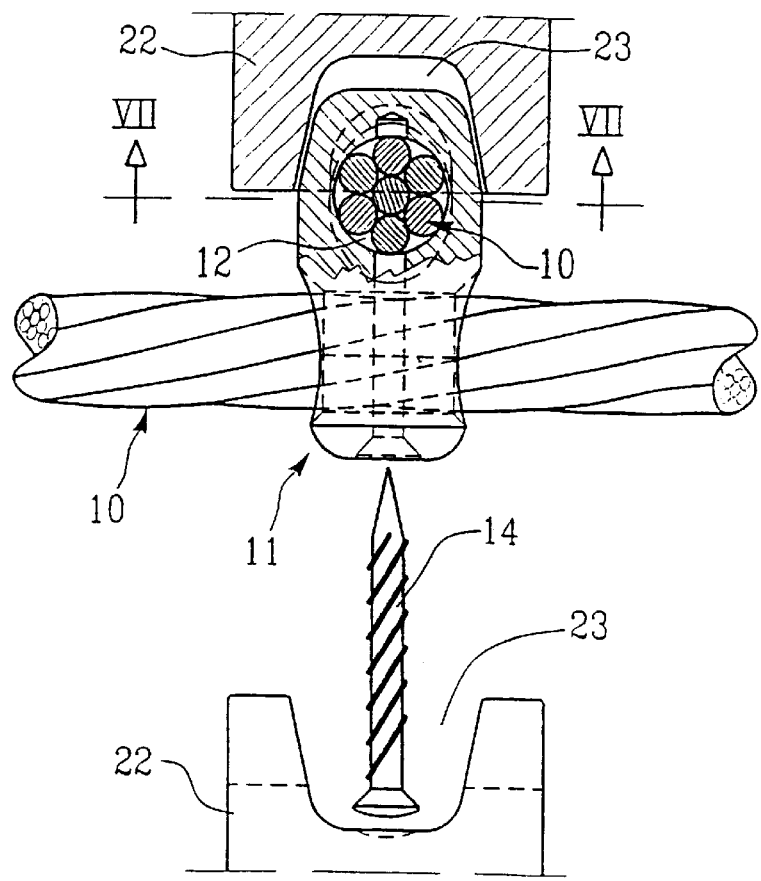
FIGS. 5 and 6 show partly in section a modified clamping lock for interconnection of two wires and the clamping jaws for effecting the clamping operation.
Figure 6:
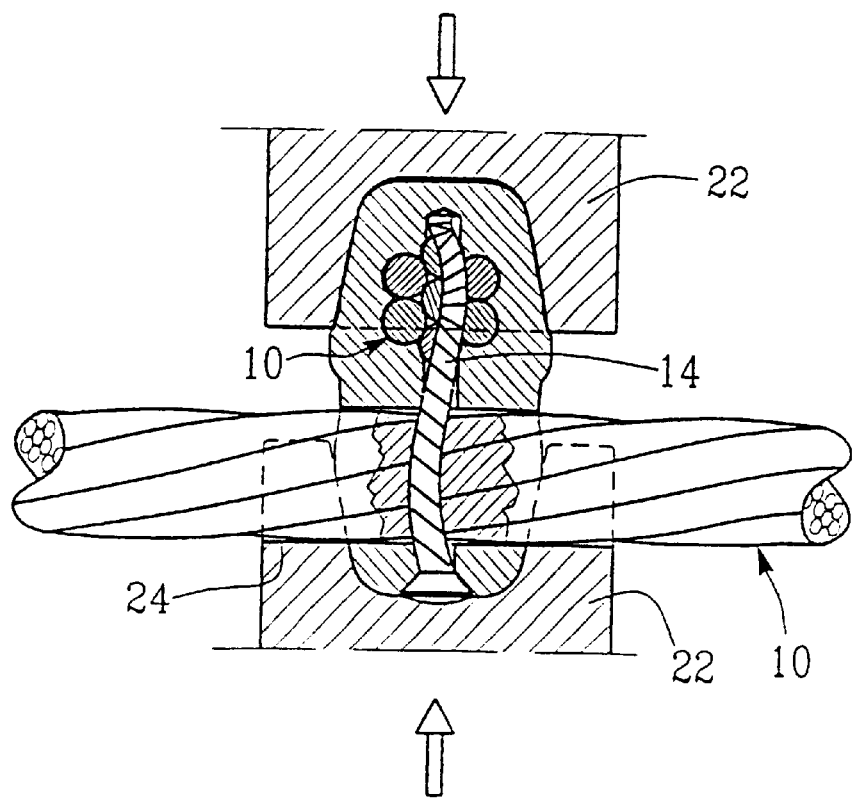
Figure 7:
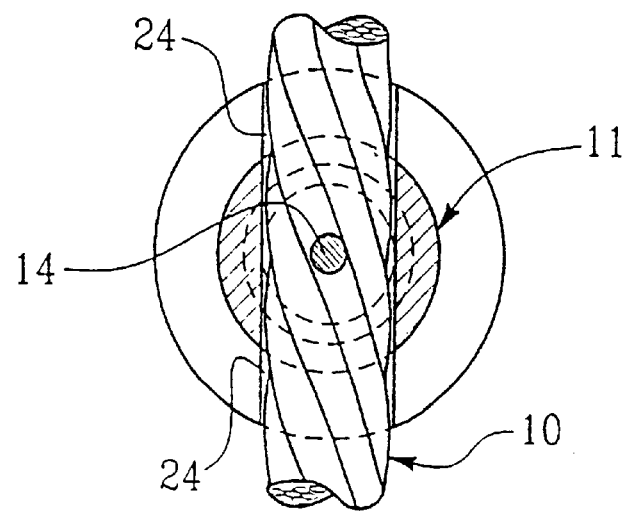
FIG. 7 shows a section along the line VII—VII in FIG. 5.

At the embodiment according to FIGS. 5–7 both end portions of the clamping lock 11 are designed tapering, i.e. they have the shape of a frustum of a cone, and are intended to be compressed by clamping jaws 22 having corresponding tapering form spaces 23. In the clamping jaws is furthermore provided grooves 24 intended to receive a portion of the wire 10. In the manner is obtained a radial as well as an axial compression of the clamping lock 11. The axial compression results in that the locking member 14—the screw—, which can extend through both wires 10, is upset, which renders it impossible to untighten it again. The screw can be so long, that it also will be anchored in the end portion of the sleeve after it has been screwed through the wire or the wires.

Figure 8:
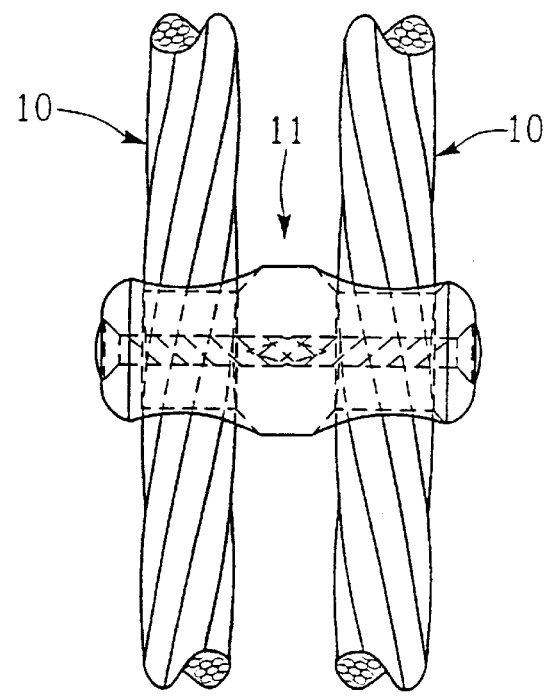
FIG. 8 shows a clamping joint in side view, for parallel interconnection of two wires.
Figure 9:
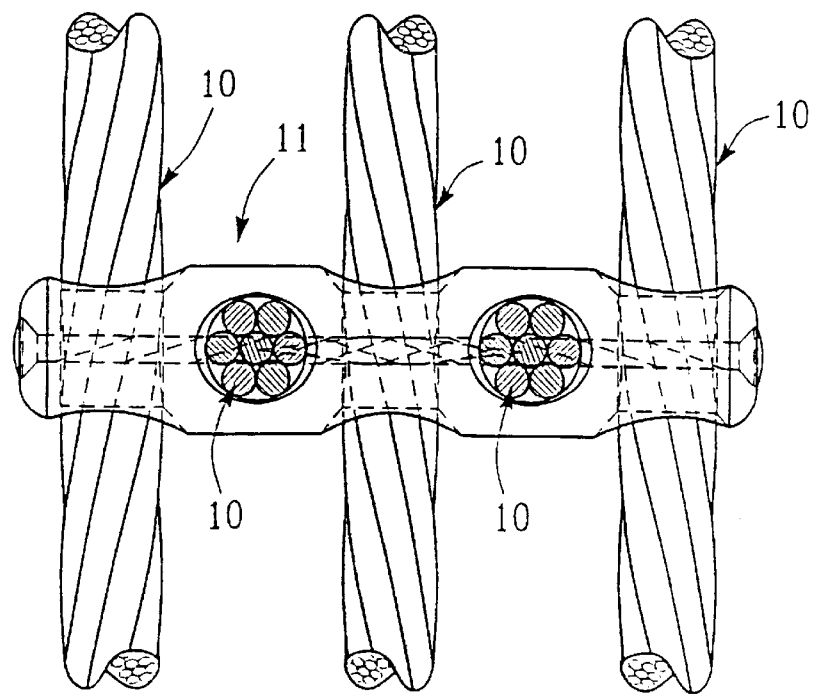
FIG. 9 shows a clamping joint for interconnection of five wires.

FIG. 8 shows a variant of the clamping joint, which is used for locking two wires 10 extending in parallel. FIG. 9 shows still another variant, wherein the clamping joint encompasses five wires 10. In this case there is used two screws of different lengths, one of which extends through two wires, whereas the other screw extends through three wires.

Figure 10:
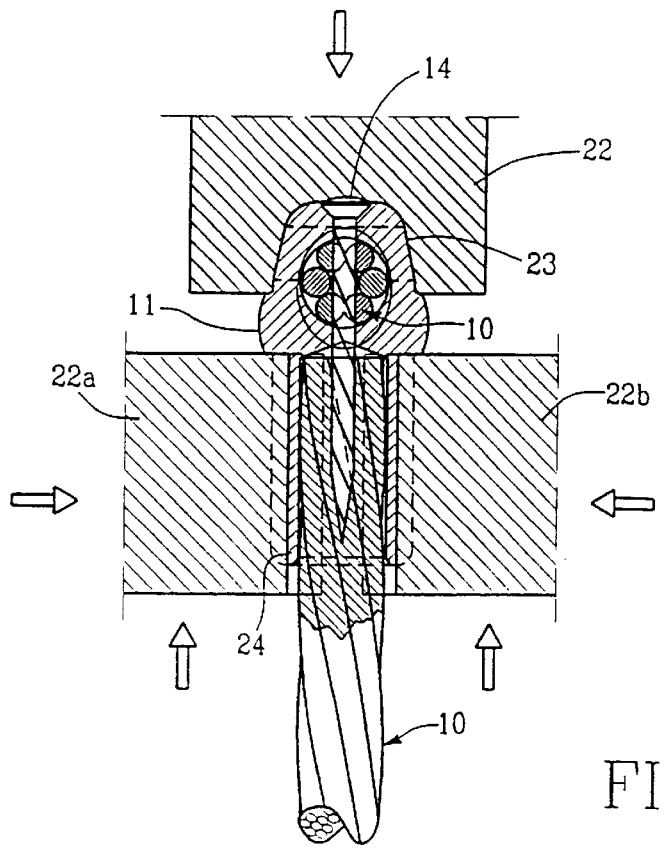
FIG. 10 shows a section through a T-shaped clamping joint during the clamping operation.

The clamping lock according to FIG. 10 is a so called T-joint, where one end of a wire 10 has been interconnected with a lateral wire 10 in the manner described above, i.e. the claiming joint incorporates two different parts 11 and 24 arranged at an angle of 90° to each other. The locking of the two wires is preferably effected with a common locking member 14, which as been screwed first through the transverse wire, in order thereupon to each axially into the end portion of the other wire via a bore in the intermediate wall 13.

The length of the locking member 14 is so dimensioned that it extends along a substantial part of the total length of the lock 24. The compression is effected by means of split clamping jaws 22a and 22b, which compress the axial locking part, whereas the clamping jaw 22 with the tapering shaped from space 23 at the same time compresses the other locking part of the clamping lock.

Figure 11:
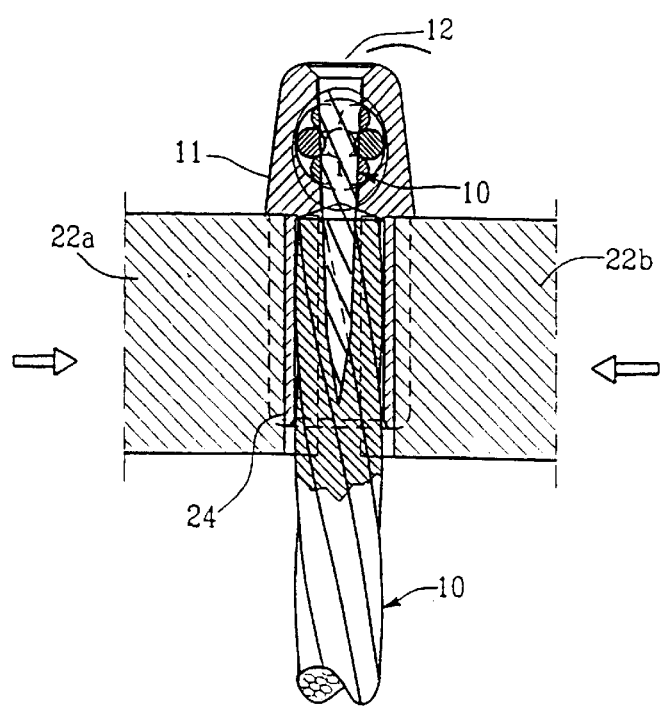
FIG. 11 shows a modified T-joint.

The embodiment according to FIG. 11 differs from the one shown in FIG. 10 in that the sleeve portion 11 is not subjected to any compression. The arresting of the wire 10 extending through the sleeve 11 is effected by means of a locking member 14, which can be designed in different manners, e.g. with a cylindrical or tapering shape over a substantial part of its length. It might also be advantageous that the shank of the locking member is tapering and the very locking screw cylindrical. possible within the scope of the accompanying claims. The wires 10 may for instance be of different thickness, the bore 12 can be made as an oblong hole for receiving two wires side by side, and it is also possible to provide more than one locking member for each wire. It is also quite within the scope of the invention to combine structural details from different embodiments.

What is claimed is:

1. A clamping joint in form of a sleeve for interconnection of a clamping lock with at least one wire, which is insertable therein, which clamping lock is manufactured in one piece and after compression during plastic deformation in clamping tool seizes and arrests the wire in the lock, wherein at least one locking member, under clamping of the wire against the clamping lock, is arranged to extend a substantial part in the wire, that after the plastic deformation of the clamping lock and compression of the wire in the said clamping tool, the clamping lock material is formed to the surface structure of the wire and the locking member, which eventually is upset, to render an untightable interconnection between the wire, the locking member and the clamping lock.

2. A clamping lock as claimed in claim 1, wherein both end portions of the clamping lock, each of which incorporate at least one wire are tapering towards each end, and are intended to be compressed by clamping jaws equipped with correspondingly tapering form spaces and grooves for a portion of the wire.

3. A clamping lock as claimed in claim 1, wherein each locking member extends substantially perpendicularly through in at least one wire.

4. A clamping lock as claimed in claim 1, wherein the wire is a combed wire incorporating steel fibers and natural fibers, and the clamping lock is manufactured by extrusion of an aluminum alloy.

5. A clamping lock as claimed in claim 1, wherein the sleeve is equipped with bores for the locking means, which are coaxial to each other.

6. A clamping lock as claimed in claim 1, wherein one end portion of the clamping lock is designed for axially receiving one end of a wire, whereas the other end portion of the sleeve is provided with at least one transverse bore, and that the locking member is arranged to extend transversely through one of the wires and a distance substantially axially into the other wire.

7. A clamping lock as claimed in claim 1, wherein each locking member extends substantially axially, centrally in at least one wire.

8. A clamping lock as claimed in claim 1, wherein the wire is a combed wire incorporating steel fibers and synthetic fibers, and the clamping lock is manufactured by extrusion of an aluminum alloy.

9. A clamping lock as claimed in claim 1, wherein the sleeve is equipped with bores for the locking means, which are eccentric relative to each other.

10. A method for producing a clamping joint by interconnecting a clamping lock with at least one wire, that is insertable therein, and which is compressed under plastic deformation and thereby seizes and arrests the wire in the lock, wherein prior to the compression at least one locking member is inserted through an opening in the clamping lock and is clamped or screwed onto the wire, whereupon the lock is subjected to said compression, whereby the material of the lock flows into and adapts itself to the shape of the wire at least partially to the locking member.

* * * * *